Jan. 12, 1954　　J. R. URSCHEL ET AL　　2,665,723
MACHINE FOR SLICING CORN KERNELS
Filed Feb. 3, 1953　　3 Sheets-Sheet 3

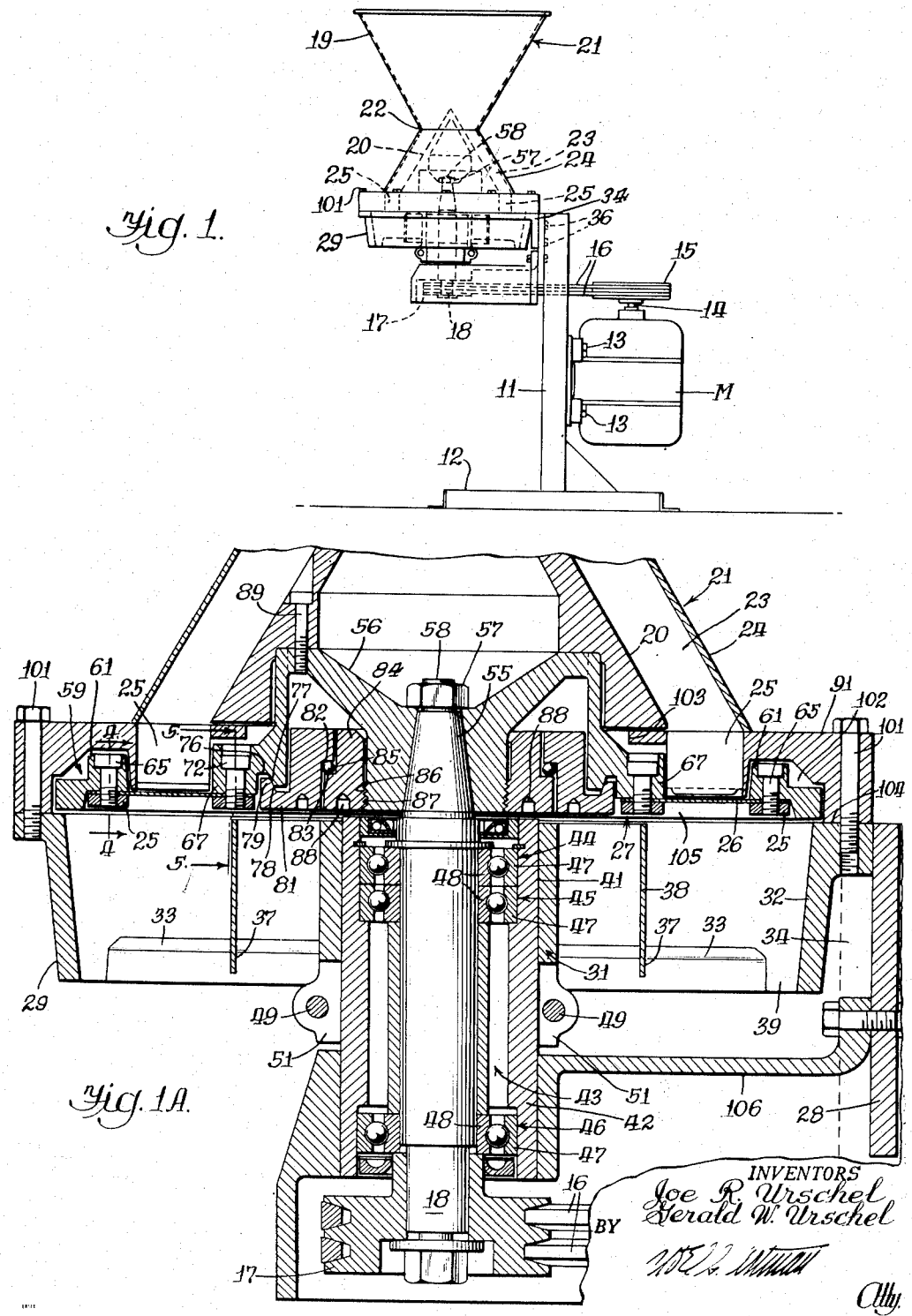

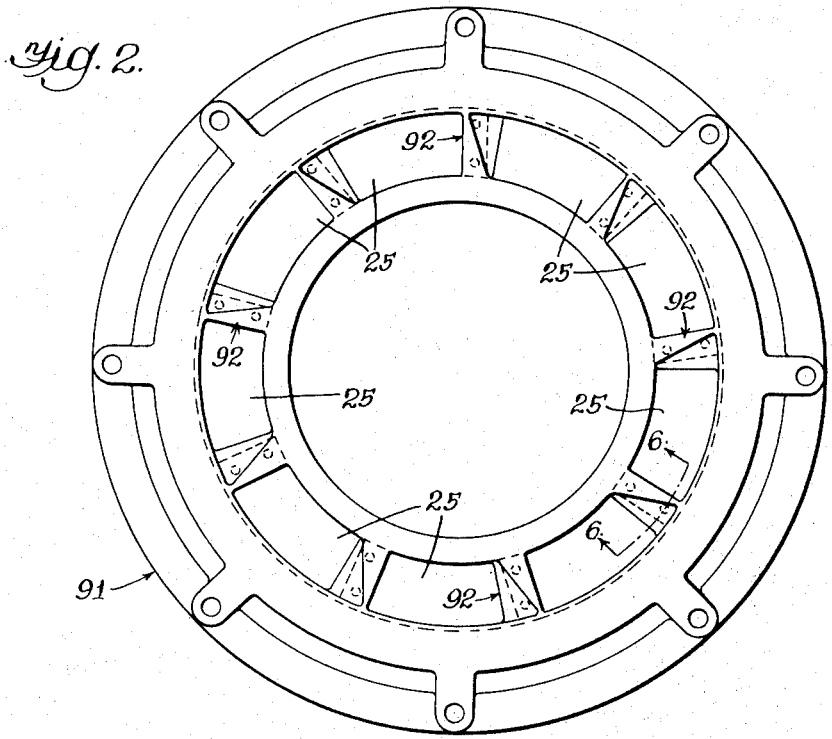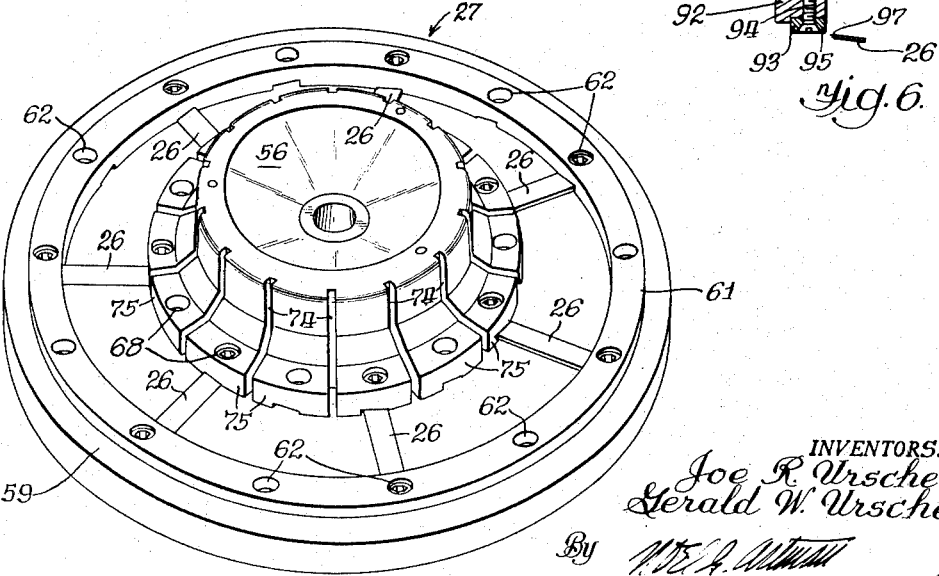

INVENTORS.
Joe R. Urschel
Gerald W. Urschel

Patented Jan. 12, 1954

2,665,723

UNITED STATES PATENT OFFICE 2,665,723

MACHINE FOR SLICING CORN KERNELS

Joe R. Urschel and Gerald W. Urschel,
Valparaiso, Ind.

Application February 3, 1953, Serial No. 334,892

18 Claims. (Cl. 146—124)

This invention relates to machines adapted to slice the individual particles of bulk particle commodities such as the individual kernels of sweet corn which have been removed from the cob in the process of industrial canning, and more particularly concerns a rotary slicing knife frame with thin knives held under tension therein together with means for feeding the particles into the path of the knives which are revolved at high speed during operation of the machine.

The procedure used for many years in making cream style corn has been to shear whole kernels from the cob and to mix these kernels with a creamy product obtained by scraping the cobs attendant to removing the residue portions of the sheared kernels. Because of the difficulty of separating corn silks and small cob fragments from the product thus prepared this process has become less popular. The process has also been unsatisfactory in regions where corn borers have been prevalent inasmuch as scraping of the cob would cause them to become inseparably mixed with the product. These problems which have been present in this previous method of preparing creamed corn have been averted by using only the kernels which have been sheared from the cob. While these kernels are whole they can be thoroughly cleaned in machines available for that purpose. The cream component of the creamed corn is then prepared by grinding a portion of the kernels and remixing with whole kernels which have been sliced to diminish the size of the particles in the finished product to improve its consumer acceptance.

One difficulty that has been encountered in this newer process of making creamed corn is the cutting of the relatively tough skin of that portion of the kernels which are sliced. In machines heretofore used for slicing these kernels much of the material encased by the skins has been separated therefrom without actual slicing and when this occurs the product will contain empty shell-like skins which lower the quality of the product.

An important object of this invention is the provision of a machine capable of effectively slicing essentially all of corn kernels passed therethrough without separation of skin fragments from the interior portions of the kernels.

A further object is the provision in a machine capable of slicing small sliceable products of an annularly arranged group of compartments into which the small sliceable particles are directed and from which they are directed into the path of thin high tensioned knives forming the spokes of a slicing wheel or carrier rotatable coaxially with the annular series of pockets and cooperable with shearing edges formed on the walls at the outlet ends of the pockets to shear the discharged particles.

Another object is the provision of a conical particle directing surface rotatable with a slicing knife wheel in the environment of the next preceding object, and said conical surface being operable complementally with a conical hopper wall therebout to form a conical chute for guiding the sliceable particles from a hopper into the compartments from which said particles are fed into the revolving knives.

Still another object is the provision of a simple wheel-like knife carrier structure easily manipulatable to adjust and maintain the radially extending and tensioned blades under uniform desired tension.

A further object is the provision of a blade tension adjusting structure manipulatable to simultaneously adjust the cutting blades of a rotary blade carrier of the type wherein the cutting blades form the sole means of connection between its central hub and the outer rim and such adjustment being achieved without disturbing the concentricity of the rim and hub so the rotary carrier will run true and in balance at high speeds.

Yet another object is the provision of a blade tension adjusting structure affording adjustment by using a hub to which the cutting blades are anchored at their inner ends, said hub being capable of uniform stressing in a radial direction to uniformly increase or decrease the tension of each of the cutting blades.

Still another object is the provision for such a rotary blade carrier of a hub which is axially slotted on radial planes passing through the axis of rotation thereof, thereby affording a plurality of flexible fingers, each forming an anchor point for a properly tensioned cutter blade, the flexible fingers including elements of a frusto-conical surface which cooperates with an axially moving member having a mating frusto-conical surface to adjust the radial displacement of the fingers equally and consequently attain equal tension in the blades.

The above and other objects inherent in and encompassed by the invention are more fully elucidated in the ensuing description, the appended claims and the annexed drawings, wherein:

Fig. 1 is a side elevational view of a machine constructed in accordance with the invention.

Fig. 1A is an enlarged fragmentary view illustrating the principal machine parts and constituting a vertical section at a plane coinciding with the vertical axis of the machine.

Fig. 2 is a plan view of a passage structure containing a circle of passages for receiving small sliceable products to be operated upon by the machine.

Fig. 3 is a perspective view directed downwardly and sideward with respect to a slicing knife wheel illustrated in such figure.

Fig. 6 is an enlarged sectional view taken at the plane indicated by the line 6—6 through one of the radial partitions in Fig. 2.

Figure 7:
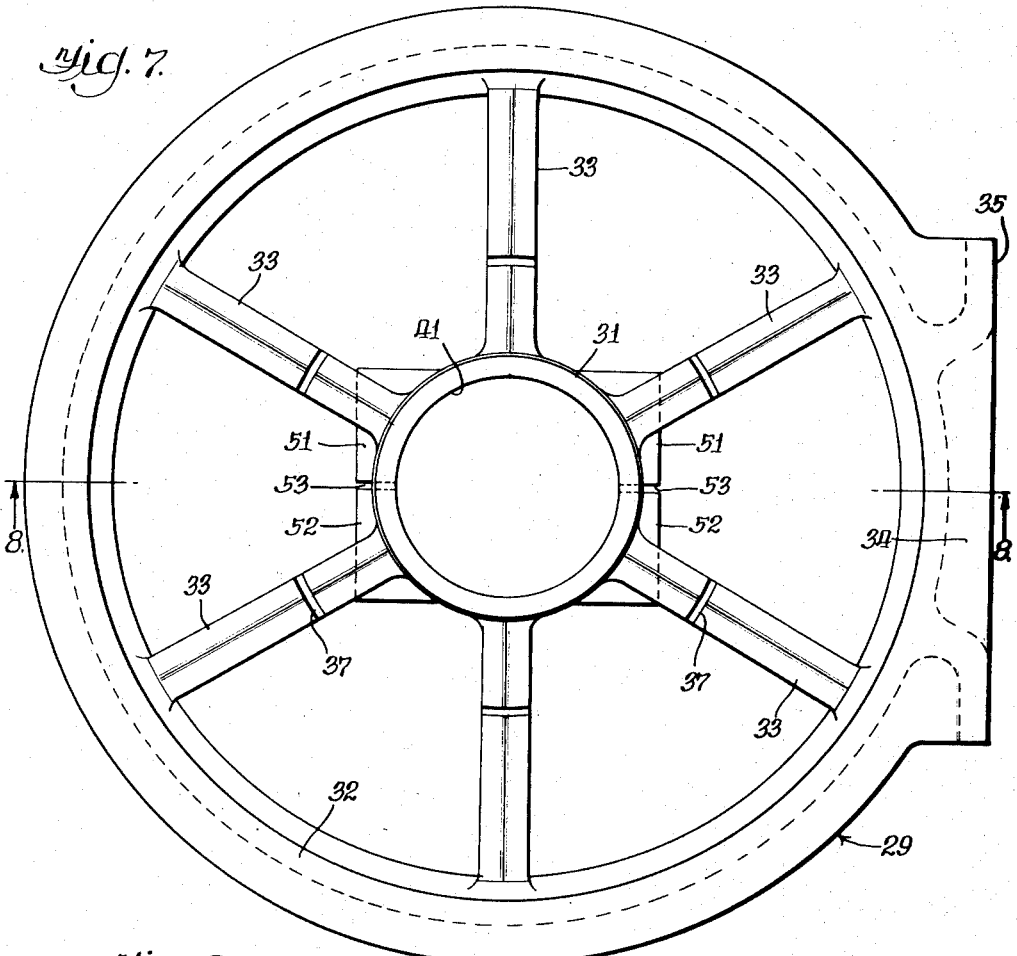
Fig. 7 is a plan view of a frame component of the machine.
Figure 8:
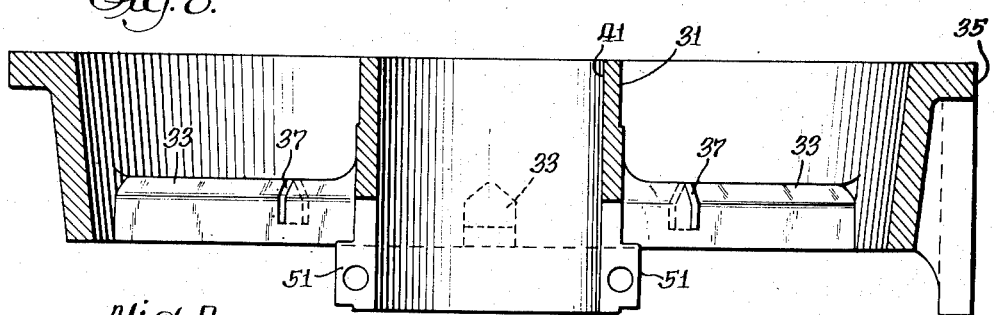
Fig. 8 is a vertical sectional view taken at the plane indicated by the line 8—8 in Fig. 7.

With continued reference to the drawings and particularly to Fig. 1, the machine can be seen to comprise a standard 11 mounted upon and projecting upwardly from a base 12. An electric motor M for driving the machine is secured to the standard 11 by cap screws 13 to dispose the armature shaft 14 of such motor vertically. Power is transmitted from the motor armature shaft to the principal part of the machine through a double grooved pulley 15 and a multiple belt 16 trained over such pulley and a multiple grooved pulley 17 with which the lower end of a drive shaft 18 is constrained for rotation.

Small sliceable products such as corn kernels sliced from the ears of immature corn are introduced into the machine through a flared upper portion 19 of a hopper 21. This product (or products) is fed downwardly through a throat portion 22 of the hopper, thence through a downwardly and outwardly flared annular passage 23 formed between a conical lower portion 24 of the hopper and a feeding cone 20. From the lower end of the downwardly flared passage 23 the product feeds into a circle of passages 25, and as the product particles emerge from the lower or discharge ends of the passages 25 they are sliced by radial knives 26 of a slicing knife wheel 27 constrained for rotation with the drive shaft 18; see Figs. 1A and 3.

That part of the machine mounted upon the upper end of the standard 11 is carried by a cross member 28 thereof. A circular frame 29, Figs. 1, 1A, 7 and 8, has a central hub portion 31, an outer rim portion 32, and a plurality of spoke-like members 33 interconnecting the hub and rim. A mounting pad 34 at one side of the frame rim 32 has a face 35 which lies flatly against the standard cross member 28 in which position the frame is secured to the cross member by cap screws 36. A plurality of arcuate grooves 37 in the upper sides of the frame spokes 33 are arranged in a circle for receiving a cylindrical member 38, Fig. 1A, disposed in concentric relation with the frame rim 32 to form therewith an annular discharge passage 39 for the sliced product precipitated downwardly from the slicing knives 26.

A cylindrical opening 41 in the frame hub 31 receives an outer tubular element 42 of a bearing unit 43 which rotatively supports the vertical drive shaft 18 and the parts carried thereby. This bearing unit, in addition to the sleeve 42, also comprises ball bearing units 44, 45, and 46 of which the outer races 47 are rigidly assembled with the sleeve and of which the inner races 48 are constrained for rotation with the drive shaft 18. The sleeve 42 is held immovably within the frame hub 31 by the tightening of bolts 49 to grip portions 51 and 52 of the hub, separated by a slot 53, onto said sleeve.

Figure 4:
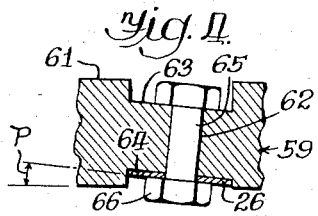
Fig. 4 is an enlarged fragmentary sectional view taken through a rim portion of the slicing knife wheel at the plane indicated by the line 4—4 in Fig. 1.

A tapered upper end portion 55 of drive shaft 18 has a hub 56 of the wheel or blade carrier 27 mounted non-rotatively with respect thereto by means of a nut 57 turned onto a reduced diameter threaded end portion 58 of said shaft. The cutting blades 26 constitute the sole connecting means between the circular hub 56 and a rim 59 which will become most apparent from Fig. 3. These knives or blades are spaced equidistantly circumferentially of the wheel or carrier 27. Said blades are fabricated from thin strip-like pieces of hardened and tempered steel and are twisted slightly throughout their length so as to present a constantly varying pitch gradient for their cutting edges 97, Fig. 6, of which the purpose is dealt with in the applicant's U. S. Patent No. 2,482,523 issued September 20, 1949, for Slicing Machines. Referring particularly to Figs. 1A, 3 and 4, the rim 59 can be seen to be formed with an annular axially offset portion 61 which contains a plurality of bores 62 which, as illustrated in Fig. 4, have their axes skewed to the plane of the rotary cutter wheel 27. The opposite faces of the offset portion 61, axially of the cutter wheel, are countersunk and face milled as shown at 63 and 64 in registry with each of the bores 62 to provide a seat for the head of a knife-holding bolt 65 and for the outer ends of the cutter blades 26. The blades are held in place by nuts 66 threaded onto the lower ends of the bolts 65. Each of the blades at their outer ends are thus skewed slightly as illustrated in Fig. 4 to provide an angle $p$ for such outer ends of the blades.

Figure 5:
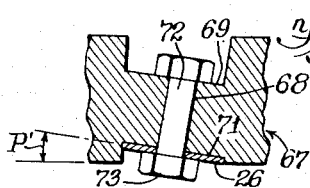
Fig. 5 is an enlarged fragmentary sectional view taken through a portion of the hub of the slicing knife wheel at the plane indicated by the line 5—5 in Fig. 1.

The inner ends of the blades 26 are anchored similarly to the outer ends thereof excepting that a greater pitch angle $p'$, Fig. 5, is provided therefor. To facilitate attachment of the inner ends of the blades, the hub 56 is provided with a circular flange 67 provided with a plurality of circumferentially spaced bores 68 which are skewed to the plane of the rotating cutter wheel, the amount of such skew being greater than that for the bores 62 in the rim 59. The opposite faces of the hub flange 67, axially of the cutter wheel, are milled adjacent each of the bores 68 with a facing cutter set at the same skew angle as the bore 68 with reference to the plane of the rotary cutter wheel to provide seats 69 and 71 for the heads of knife-holding bolts 72 and respective inner ends of the cutter blades 26 which are held to the seats 71 by nuts 73 cooperating with the bolts 72. Since the outer ends of the blades 26 are secured in place at a pitch angle $p$ and the inner ends thereof are secured in place at a greater pitch angle $p'$, each of the blades is twisted lengthwise thereof to create a varying pitch measured transversely thereof and uniformly decreasing proportionally to the proximity to the outer ends of the blades.

Means is provided to facilitate radial flexibility of the hub flange 67 wherefore each cutting blade 26 will have a resilient anchorage at its inner end. Such flexibility is obtained by forming a plurality of radial slots 74 in the wheel hub. These radial slots divide the hub flange 67 into a plurality of circumferentially spaced flexible fingers 75. These fingers 75 correspond in number and are aligned radially of the wheel respectively with the bolt-receiving bores 62 in the wheel rim 59. In Fig. 3 the wheel is illustrated with only half the number of blades 26 as there are attaching fingers 75 and knife-attaching means paired therewith in the rim 59. The number of blades actually assembled in the wheel may be varied as desired so long as they are spaced equidistantly about the wheel to maintain its dynamic balance during rotation.

A further factor influencing dynamic balance of the wheel is equal radial stress upon the blades 26 assembled therein. This is necessary to assure concentricity of the hub and rim at all rotative speeds of the wheel. Equal radial stress upon the blades 26 is accomplished by forming a groove 76 in the lower end of the wheel hub concentrically with the wheel axis, said groove 76 traversing and having short segments thereof respectively in the lower sides of the resilient fingers 75. Said groove 76 has a frusto-conical surface 77 cooperable with a frusto-conical surface 78 concentrically thereabout upon an annular flange 79 of a blade tensioning block 81. Tensioning block 81 has an annular shoulder 82 in opposed relation axially of the cutter wheel to an annular shoulder 83 of an annular nut 84. These two shoulders 82 and 83 form ball races cooperable with a circular series of ball bearings 85. An internal threaded section 86 of the annular nut meshes with a complementally threaded section 87 upon the hub 56. Annular nut 84 is rotatable by the use of a spanner wrench (not shown) of which the projections are receivable by recesses 88 in the lower end of said nut. After the knives 26 have been assembled with the bolts 65 and 72 at their outer and inner ends respectively the nut 84 will be rotated in the proper direction relatively to the hub 56 for advancing the nut and consequently the knife tensioning block 81 upwardly relatively to the hub as viewed in Fig. 1. This movement of the tensioning block 81 relatively to the hub causes the camming surface 78 to cooperate with the camming surfaces 77 on the fingers 75 for deflecting the lower portions of such fingers radially inwardly of the hub a uniform amount for uniformly tensioning the knives 26 connected therewith. Frictional engagement of the surfaces 77 and 78 prevents rotation of the tensioning block 81 relatively to the hub 56 and the ball bearings 85 are provided to facilitate rotation of the nut 84 relatively to the block 81 while exerting axial pressure thereon pursuant to rotation of the nut upon the threaded portion 87 of the hub.

The feeding cone 20 is mounted in superimposed relation upon the hub 56 where it is constrained for rotation coaxially therewith by a circle of cap screws 89, of which one is visible in Fig. 1A. It will be noted that the base of the cone 20 has a diameter substantially equal to the spacing between diametrically opposite product-receiving passages 25 in an annular passage-containing structure 91, Figs. 1A and 2. Referring more particularly to Fig. 2 where there is a plan view of the structure 91, it can be seen that this structure embodies a circle of product-receiving passages 25 and this circle of passages is coaxial with the cutter wheel 27. Passages 25 are arranged alternately in the circle with radial partitions 92 which separate each passage 25 from the ones adjacent thereto. The lower side of each partition 92 has secured thereto a shear plate 93 by means of screws 94. These shear plates amount to downward extensions of the partitions 92 and each provides a cutting edge 95, Fig. 6, considered to be at the lower edge of an approach face 96 of the associated partition 92. The cutting edges 95 of course extend radially of the structure 91 and of the cutter wheel 27. The shearing edges 95 are of substantially the same length as the blades 26 of the cutter wheel and are placed the same distance radially from the axis of the cutter wheel as are the knives 26 whereby the knives successively pass in close proximity with the shearing edges 95 during rotation of the wheel to cooperate therewith in shearing slices from the product fed downwardly through the passages 25. During operation of the machine the cutter wheel is rotated clockwise, as viewed from above, wherefore sharpened cutting and leading edges 97 of these knives, Fig. 6, successively approach the shearing edges 95 at the lower edges of the approach faces 96. Opposite to the approach face of each partition 92 there is a departure face 98, and each partition also has an upper product-accommodating face 99 declining circumferentially of the structure in the direction of cutter wheel rotation.

The passage-containing structure 91 which is secured upon the upper end of the frame 32 by a circle of cap screws 101 contains an annular recess 102 in its under side radially outwardly from the circle of product-receiving passages 25. This annular recess 102 is for accommodating the cutting wheel rim 59. A central opening 103 in the structure 91 receives the cutter wheel hub 56. All of that portion of the passage-containing structure 91 disposed radially inwardly from an annular lower face 104 which rests upon the upper end of the frame 29 is spaced upwardly from such frame to cooperate therewith in providing a space 105 therebetween for accommodating part of the cutter wheel hub, the knives or blades 26 and the outer rim 59 of the wheel.

*Operation of the apparatus*

When the machine is set in operation by power received from the electric motor M, the cutter wheel 27 will be rotated clockwise, as viewed from above. This causes like rotation of the conical feeding cone 20 which is mounted upon and constrained for rotation coaxially with the cutter wheel hub. Small sliceable products such as kernels of sweet corn in the process of being treated for canning are introduced into the upper portion 19 of the hopper 21 and fed downwardly through the throat 22 into the downwardly flared passage 23 formed between the conical lower portion 24 of the hopper and the conical feeding member 20. Inasmuch as the conical member 20 is rotating at high speed with the cutter wheel 27, the small products coming in contact with the conical surface of this wheel are deflected thereby tangentially of the horizontal sections of such cone wherefore after contact with the cone the products move diagonally somewhat circumferentially thereof while descending through the downwardly flared passage 23. In addition to imparting downward swirling movement to the sliceable products within the flared passage 23, the rapidly rotating cone develops sufficient centrifugal force upon any product tending to cling thereto to prevent an adherence and in this way turbulates the product and prevents its clogging the passage 23.

Inasmuch as the small sliceable products will be swirling clockwise, as viewed from above, as they descend into the product-receiving passages 25, entry of the product into these passages is facilitated by declining the upper product-accommodating faces 99 of the radial partitions 92 as indicated in Fig. 2 and more specifically illustrated in Fig. 6. Thus the products can continue their circular or swirling downward movement within the passages 25 to carry against the approach faces 96 of the partitions 92 and advance downwardly of these faces 96 to the cutting edge 95 so that as portions of the small products advance downwardly beyond the cutting edge 95 they will be sliced away by successively approaching knives 26. That portion of the small sliceable products bouncing back from the approach faces 96 and those products initially passing in free flight downwardly through the passages 25 will be sliced while in such free flight when descending into the path of the thin rapidly revolving knives. The shearing edges 95 are cooperable with the knives in slicing those products which are reached by the knives adjacent to said edges, and likewise cooperable with the knives to cut any skin or tough flexible parts tending to fold over and lodge on the knives. The slice particles of the small products are discharged downwardly through the interior of the frame 29 into the annular space between the rim 32 thereof and the cylindrical sheet metal wall 38. A combination hood and bearing supporting bracket 106 prevents the sliced product from alighting on the belt 16 as such product descends through the frame into a suitable receptacle (not shown).

Having thus described a single preferred embodiment of the invention with the view of clearly and concisely illustrating the same, we claim:

1. In a machine for slicing small sliceable products, a stationary structure comprising a circle of passages which communicate through such structure axially of such circle, each passage having a product-receiving end and a product-discharge end, said structure also comprising partition walls arranged alternately with said passages to separate each from the ones adjacent thereto, means providing shearing edges respectively on said partitions adjacent the discharge ends of said passages, a product-feeding cone disposed with its principal axis coaxial with said circle, the base of said cone being disposed contiguously with said structure on the side thereof common to the receiving ends of said passages and the small diameter end portion of the cone projecting upwardly from the structure, the base of said cone having a diameter substantially equal to that of the area embraced by said circle of passages, a hopper having a product-holding portion above the cone, a lower conical portion embracing the cone and spaced radially outwardly therefrom to cooperate with the cone in forming a downwardly flared annular feeding passage for directing the products from the upper part of the hopper downwardly into the circularly arranged passages, a cutting wheel rotatable coaxially with said circle of passages upon the opposite side of the passage-containing structure from said cone, said wheel comprising knives disposed substantially in horizontal planes and extending radially to sweep in registry with the product-discharge ends of said passages attendant to rotation of the wheel, said knives having cutting edges which successively approach the cutting edges on said partitions attendant to rotation of the wheel to cooperate therewith in scissorlike fashion for slicing products fed downwardly through the passages.

2. The combination set forth in claim 1 wherein said passage-containing structure has a central opening intersected by said axis, wherein a hub portion of said wheel extends upwardly through said opening, and wherein the cone is mounted upon an upwardly extending portion of the hub and constrained for rotation therewith.

3. The combination set forth in claim 2 wherein said wheel comprises a rim disposed radially outwardly thereof from said circle of passages, and wherein the lower side of the passage containing structure contains an annular recess registering with and receiving a portion of said wheel rim.

4. In a machine for slicing small sliceable products, a stationary structure comprising a horizontal circle of upright product-receiving passages communicating through such structure axially of such circle, each passage having an upper product-receiving end and a lowermost product-discharge end, said structure also comprising partition walls arranged radially of said circle and alternately with said passages circumferentially of the circle to separate each passage from the ones adjacent thereto, means providing shearing edges respectively on said partitions adjacent the discharge ends of said passages, a cutting wheel rotatable coaxially with said circle of passages adjacent the lower side of said structure, said wheel comprising knives disposed substantially in horizontal planes and extending radially of the wheel to sweep successively contiguously across the discharge ends of said passages attendant to rotation of the wheel, each knife having a cutting edge forming a horizontal radially extending edge thereof and which successively approach the cutting edges on said partitions pursuant to rotation of the wheel to cooperate with the partition cutting edges in scissor-like fashion for slicing products fed downwardly through the passages, a product-feeding cone constrained for rotation coaxially with said wheel and disposed with the apex of such cone above the base thereof, the base of the cone being at an elevation at least substantially as high as the product-receiving ends of said circle of passages and having a diameter substantially equal to that of the area embraced by the circle of said passages, and a wall having a conical inner periphery embracing said cone and spaced radially outwardly therefrom to cooperate with said cone in forming a downwardly flared annular feeding passage for directing the products downwardly into the circularly arranged passages.

5. The combination set forth in claim 4 wherein at least a portion of said partitions each include an approach face extending between the receiving and discharge ends of an associated wall of the product-receiving passages and facing into such associated passage in the direction opposite to that in which the knives sweep across said passage, the cutting edges of said partitions coinciding with the lower edge of said approach faces, each of said partitions also having a departure face extending upwardly from a passage discharge end associated therewith, and a product-accommodating face extending angularly upwardly from an upper edge of such departure face and in the direction opposite to that in which the knives sweep past the partitions.

6. The combination set forth in claim 4 wherein at least a portion of said partitions each include an approach face extending between the receiving and discharge ends of an associated of the product-receiving passages and facing into such associated passage in the direction opposite to that in which the knives sweep across said passage, the cutting edges of said partitions coinciding with the lower edge of said approach faces, each of said partitions also having an upper product-accommodating face declining tangentially of said circle to the side of such partition opposite to the approach face thereof.

7. In a machine for slicing small sliceable products, a product-receiving passage-forming structure having a substantially horizontal circle of upright product-receiving passages communicating between an upper side thereof and a lower side thereof, said structure comprising a plurality of partitions arranged radially of the vertical axis of said circle alternately with said passages to separate each from the ones adjacent thereto, each of at least a portion of said partitions having an approach face forming a side of a respective product-receiving passage, means providing cutting edges extending radially of said circle coinciding with and forming respective lower edges of said approach faces, and each of said partitions having an upper product-accommodating face declining tangentially of said circle to a side of such partition opposite from the approach face thereof.

8. In a machine for slicing small sliceable products, a frame having bearing means disposed about a vertical axis therein, a structure superposed on said frame and providing a space between the upper side of said frame and the lower side of said structure, said structure having a central opening coaxial with said axis and also having a horizontal circle of upright product-receiving passages radially outwardly from said central opening and communicating through such structure longitudinally of said axis, each passage having an upper product-receiving end and a lowermost product-discharge end, said structure comprising partition walls arranged radially with respect to said axis and alternately with said passages circumferentially of said circle to separate each passage from the ones adjacent thereto, means providing shearing edges respectively on said partitions adjacent the discharge ends of said passages, a cutting wheel drive shaft journalled in said bearing means, a cutting wheel comprising a hub disposed within the central opening of said structure coaxially thereof and constrained for rotation with said shaft, a rim embracing said hub in radially spaced relation therefrom and a plurality of substantially horizontal knives constituting spokes of said wheel and secured under tension between the hub and the rim to constitute the sole connecting means therebetween, each knife having a cutting edge forming a horizontal radially extending edge thereof and which successively approach the cutting edges on said partitions to cooperate in scissor-like fashion therewith pursuant to rotation of the wheel for slicing products fed downwardly through the passages, a product-feeding cone having a base mounted upon the wheel hub and constrained for rotation coaxially therewith, the apex of said cone projecting upwardly from said base and said base being at an elevation at least substantially as high as the product-receiving ends of said circle of passages and having a diameter substantially equal to that of the area embraced by the circle of said passages, a hopper comprising an upwardly and outwardly flared product article-containing portion projecting upwardly from the cone, a throat portion at the lower end of said article-holding portion and a conical portion flared downwardly and outwardly from said throat portion in radially spaced embracing relation with said cone to cooperate therewith in forming a downwardly and outwardly flared annular article-feeding passage for guiding articles from the upper portion of the hopper into the circle of product-receiving passages, and passage means extending downwardly through said frame to accommodate discharge of the product sliced by said knives.

9. In a slicing machine, a rotary blade carrier comprising a rim and a central hub having spaced fingers extending axially therefrom, radially extending cutter blades anchored at their inner ends to said fingers and anchored at their outer ends to said rim, the pitch of said blades decreasing outwardly from the fingers to said rim, portions of a frustro-conical surface respectively on said fingers, a tension block having a frustro-conical surface in sliding circumscribing relation with the frustro-conical surface portions of said fingers, said tension block being movable axially of said central hub to exert an inward radial stress on said fingers and said cutter blades in accordance with the extent of such movement, a nut coaxial with said hub and block and rotatable relatively thereto, and thread means on said hub complemental with the threads of said nut and cooperable therewith incident to rotation of the nut to impart longitudinal movement to said tension block relatively to the hub to adjust the tension on said fingers and said cutter blades.

10. In a slicing machine, a rotary blade carrier comprising a rim and a central hub, radially movable members supported by said central hub, radially extending cutter blades anchored at their inner ends to said radially movable members and anchored at their outer ends to said rim, each of said radially movable members including portions of a frustro-conical surface, a tension block having a frustro-conical surface in sliding circumscribing relation with the portions of frustro-conical surface of said radially movable members, said tension block being movable axially of said central hub to exert an inward radial strain on said cutter blades in accordance with the extent of such movement, a nut coaxial with said hub and tension block and rotatable relatively thereto, and thread means on said hub complemental with the threads of said nut and cooperable therewith incident to the rotation of the nut to impart longitudinal movement to said tension block relatively to said radially movable members to adjust the tension on said cutter blades.

11. In a slicing machine, a rotary blade carrier comprising an outer rim and a central hub having spaced fingers extending axially therefrom, cam surface portions respectively on said fingers and collectively disposed in a frustro-conical arrangement, a tension block having a frustro-conical surface cooperating with the surface portions on said fingers, said tension block being adapted to move longitudinally with respect to the axis of rotation of said central hub and to exert an inward radial strain on the surface portions on said fingers and said cutter blades in accordance with the extent of such movement, a nut in threaded engagement with said hub and cooperating with the tension block, said nut being adapted upon rotation to impart longitudinal movement to said tension block to adjust the tension on said fingers and said cutter blades.

12. In a slicing machine, a rotary blade carrier comprising an outer rim and a central hub having spaced fingers extending axially therefrom, cutter blades anchored at one end to said fingers and extending radially therefrom and anchored at the other end to said outer rim, cam surface portions respectively on said fingers and collectively disposed in a frustro-conical arrangement, a tension block having a camming surface cooperating with the finger cam surfaces, said tension block being adapted to move longitudinally with respect to the axis of rotation of said central hub and to exert radial strain on said fingers and said cutter blades in accordance with the extent of such movement, a nut in threaded engagement with said hub and cooperating with the tension block, said nut being adapted upon rotation to impart longitudinal movement to said tension block to adjust the tension of said cutter blades.

13. In a slicing machine, a rotary blade carrier comprising an outer rim and a central hub having spaced fingers extending axially therefrom, cam surface portions respectively on said fingers and collectively disposed in a frustro-conical arrangement, a tension block having a frustro-conical surface cooperating with the cam surfaces of said fingers, said tension block being adapted to move longitudinally with respect to the axis of rotation of said central hub and to exert radial strain on said fingers and said cutter blades in accordance with the extent of such movement, a rotatable member in threaded engagement with said hub and cooperating with the tension block, said rotatable member being adapted upon rotation to impart longitudinal movement to said tension block to adjust the tension on said fingers and said cutter blades.

14. In a slicing machine, a rotary blade carrier comprising an outer rim and a central hub having spaced fingers extending axially therefrom, cam surface portions respectively on said fingers and collectively disposed in a frustro-conical arrangement, a member having a frustro-conical surface cooperating with the cam surfaces of said fingers, said member being adapted to move longitudinally with respect to the axis of rotation of said central hub and to exert an inward radial strain on said fingers and said cutter blades in accordance with the extent of such movement, a rotatable member in threaded engagement with said hub and cooperating with the said second member, said rotatable member being adapted upon rotation to impart longitudinal movement to said second named member to adjust the tension on said fingers and said cutter blades.

15. In a slicing machine, a rotary blade carrier comprising an outer rim and a central hub having spaced fingers extending axially therefrom, cutter blades anchored to said fingers and anchored to said outer rim, cam surfaces on said fingers, and means cooperating with said cam surfaces to simultaneously deflect the fingers radially inwardly with respect to the hub axis and thereby place a uniform tension on the cutter blades.

16. In a slicing machine, a rotary blade carrier comprising an outer rim and a central hub having spaced fingers extending axially therefrom, cutter blades anchored to said fingers and extending radially therefrom and anchored to said outer rim, cam surfaces on said radially extending fingers, means cooperating with said cam surfaces to deflect the fingers radially inwardly with respect to the hub and thereby place a uniform tension on the cutter blades, said means including a member in telescopic camming engagement with said cam surfaces, and a member for exerting an axial thrust on the last said member to deflect said fingers.

17. In a slicing machine, a rotary blade carrier comprising an outer rim and a central hub having spaced fingers extending axially therefrom, cutter blades anchored to said fingers and extending radially therefrom into anchored connection with the outer rim, cam surfaces on the outer sides of the fingers radially of the hub, means cooperating with said cam surfaces, said means including a cam member in telescopic camming engagement with said cam surfaces, a member for exerting an axial thrust on said cam, and a rotatable member for telescoping the cam member onto said fingers to displace them radially inwardly with respect to the hub axis and thereby place tension on said cutter blades.

18. In a slicing machine, a rotary blade carrier comprising an outer rim and a central hub having a plurality of spaced radial slots therein extending inwardly from the periphery thereof to provide a plurality of flexible fingers, cutter blades anchored at one end respectively to said flexible fingers and anchored at the other end to said outer rim, a frustro-conical surface formed on said hub, said radial slots intersecting said frustro-conical surface to provide a plurality of discontinuous camming surfaces, a tension block movable longitudinally with respect to the axis of revolution of said frustro-conical surface and in engagement therewith to adjust the tension of each cutter blade to an equal amount, and a nut for adjusting the position of said tension block.

JOE R. URSCHEL.
GERALD W. URSCHEL.

References Cited in the file of this patent

UNITED STATES PATENTS

| Number | Name | Date |
|---|---|---|
| 2,482,523 | Urschel et al. | Sept. 20, 1949 |
| 2,607,380 | Fitzpatrick | Aug. 19, 1952 |